May 13, 1958  T. S. ZASTROW  2,834,844

TIRE AND WHEEL ALARM

Filed Nov. 20, 1953

INVENTOR.
THOMAS S. ZASTROW
BY Paul Moore Dugger
ATTORNEYS

United States Patent Office 2,834,844
Patented May 13, 1958

2,834,844

TIRE AND WHEEL ALARM

Thomas S. Zastrow, St. Paul, Minn., assignor to Remmele Engineering Company, St. Paul, Minn., a corporation of Minnesota Application November 20, 1953, Serial No. 393,266

9 Claims. (Cl. 200—61.23)

This invention relates to new and useful improvements in a signal alarm of the type adapted to be positioned adjacent the exterior wall of a motor vehicle tire for indicating conditions of abnormality in the tire or wheel.

Signal indicators of various kinds adapted to be activated by a deflated pneumatic tire of a motor vehicle have heretofore been known. However, none of these indicators have been satisfactory for various reasons such as lack of sensitivity; lack of rugged dependability; lack of provision for flexibility upon inadvertent encounter with solid unyielding objects; and because of susceptibility to failure by becoming encrusted and infiltrated with dirt, grease, grime and other extraneous materials.

Because of the disabilities inherent in previous signals of this type, there has existed a demand for an adequate signal indicator which will detect the presence of a flat tire in a pair of duals; which will detect the presence of loose wheel clamps; which will detect the presence of a cracked or broken wheel in a pair of duals and which will detect loose or defective wheel bearings.

All of the aforementioned conditions are more or less difficult to determine by a superficial inspection likely to be given to a vehicle by a driver, particularly on an older vehicle which becomes so heavily encrusted with dirt as to almost preclude visual inspection of the surface. Furthermore, any of these conditions may occur during operation between check points and at dangerous speeds. By means of my invention, the driver is provided with a reliable signal indicator which will indicate any one of the above conditions and allow him to remedy it quickly.

It is therefore an object of this invention to provide a tire and wheel alarm of rugged dependable construction adapted to be positioned adjacent the wheel of a motor vehicle in an easy and simple manner and which operates under all conditions to detect abnormalities therein;

A further object of this invention is the provision of a tire and wheel alarm which is provided with a new and unique bracket means for attaching it adjacent the wheel of a motor vehicle, such bracket providing versatility of positioning;

A further object of this invention is to provide a tire and wheel alarm, a switch having sensitivity of operation yet one which will not inadvertently be tripped by vibration or slight engagement with extraneous objects;

A further object of this invention resides in the provision of a new and useful tire and wheel alarm being substantially completely enclosed to prevent the ingress of extraneous material and consequent malfunctioning;

Still a further object of this invention is the provision of a tire and wheel alarm having a substantially fixed mounting and yet having provision for yielding when engaged momentarily by substantially immovable objects such as stones, etc.;

Still another object of this invention is the provision of a tire and wheel alarm having a universally adaptable supporting bracket allowing precise positioning of a switch indicator adjacent the wheel of a motor vehicle;

Still a further object of this invention is the provision of a sensitive switch for a tire and wheel alarm, of low inertia and providing a replaceable waterproof unit;

Other and further objects of this invention reside in the structural features of the indicator switch, the supporting means and in the structural features of my versatile mounting bracket;

Other objects are those apparent and inherent in the apparatus as described, pictured and claimed;

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings in which corresponding numerals refer to the same parts and in which.

Figure 1:
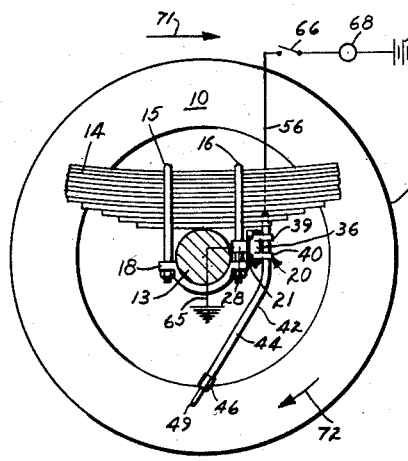
Figure 1 is a side elevational view of my invention in position adjacent the wheel of a motor vehicle; and showing in diagrammatic form the electrical connections thereto.
Figure 2:
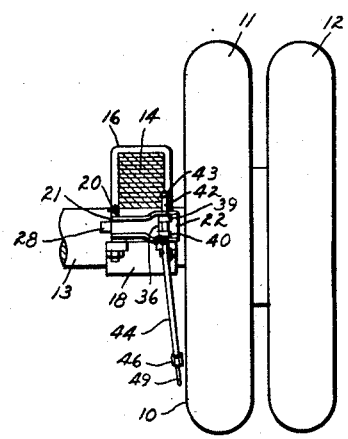
Figure 2 is a front elevational view of my invention in position adjacent the inner wheel of a pair of dual wheels of a motor vehicle showing a fragmentary portion of the motor vehicle axle, and the motor vehicle spring in cross-section.
Figure 3:
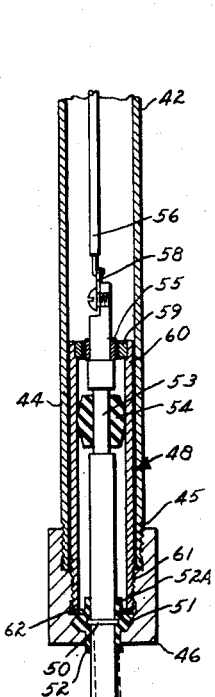
Figure 3 is an enlarged fragmentary vertical sectional view of the indicator of my invention.

Referring now to the drawings and particularly to Figures 1 and 2, my invention is adapted to be positioned adjacent the inner exterior wall 10 of the tire of a motor vehicle wheel 11. In the illustration of Figure 1, the wheel 11 is a fixed single wheel. In the illustration of Figure 2, wheel 11 is the inner member of a pair of fixed dual wheels and positioned adjacent the exterior wheel 12. In either instance the wheel 11 is supported on an axle 13 in a conventional manner. The conventional main spring 14 is positioned at right angles to and above the axle 13 and serves by means of front and rear U-bolts 15 and 16 to support a keeper 18 providing a supporting cradle for axle 13.

In the illustrations of Figures 1 and 2, the spring 14 is shown as being positioned above the axle 13. However, in many instances the spring 14 is conventionally positioned below the axle 13 and my versatile supporting brackets allows the utilization of my indicator with vehicles having springs positioned either above or below the axle and having U-bolts of varying widths. Likewise, my invention may be positioned adjacent the steerable wheel of a motor vehicle in fixed spaced relation thereto as the wheel pivots about its vertical axis without departing from the spirit and scope of this invention.

Figure 4:
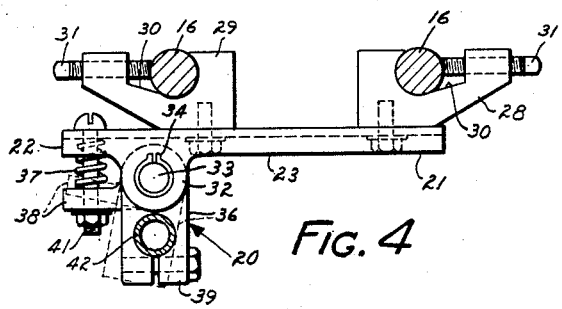
Figure 4 is a fragmentary horizontal sectional view of my invention.
Figure 5:
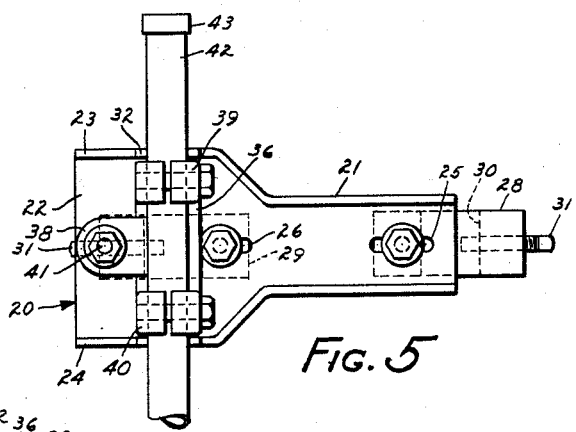
Figure 5 is an enlarged fragmentary front elevational view of my invention.
Figure 6:
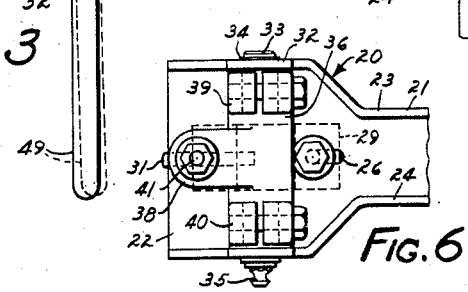
Figure 6 is a fragmentary view similar to that shown in Figure 5 but with the tubular supporting rod removed.

Referring now to Figures 4 and 5, it will be seen that my tire and wheel alarm generally designated 20 comprises a versatile mounting bracket 21 having an enlarged end 22 and edge flanges 23 and 24. It will be seen that my mounting bracket is asymmetrical along a horizontal median line and is therefore reversible for positioning adjacent the right wheel of a motor vehicle when viewed from the front thereof, as shown in Figure 2, or adjacent the left wheel of a motor vehicle when viewed from the front thereof as shown in Figure 5, this providing a universatility of mounting.

It will be seen by reference to Figures 2 and 5, that the enlarged end 22 of the mounting bracket 21 is always positioned adjacent the interior wall of the particular wheel being utilized, whatever side of the vehicle the wheel is on, thus allowing my tubular indicator support to swing away from the wheel when engaged by immovable objects as subsequently explained.

My bracket 21 is provided with two elongated apertures 25 and 26 in which are positioned cap screws engageable in asymmetrical retaining lugs 28 and 29. Each of the lugs 28 and 29 is identical but oppositely positioned as shown in Figure 4. Each is provided with a central recess 30 of the configuration shown and a set screw 31 for retaining the lug in position on one of the arms of U-bolts 16.

The provision of cap screws adjustably securing the lugs 28 and 29 in apertures 26 and 25 allows the spread between the lugs to be increased or decreased in accordance with the spread between the arms of the particular U-bolt or U-bolts being fitted. The particular configuration of the recesses in lugs 28 and 29 and the provision of set screws 31 allows my bracket to be mounted to be supported by U-bolts of various diameters.

Each of the flanges 23 and 24 is provided with a horizontally extending apertured boss 32 which cooperates to provide a bearing for pivot pin 33 having at one end thereof a split keeper ring 34 and at the other end thereof an Alemite fitting 35 for lubrication thereof. Positioned for rotation about the vertical axis of pin 33 as shown best in Figure 5 is the split ear retaining bracket 36. Bracket 36 is provided with a central lug 38 and spaced split ears 39 and 40 adapted to be drawn together by cap screws inserted therein as shown in Figure 5. Bracket 36 is free to pivot about pin 33 but is maintained in the full line limit position of Figure 4 by a retaining bolt 41 around the shank of which is positioned a compression spring 37 which engages the face of bracket 21 and the cooperating face of lug 38.

It will be thus seen that the compression spring 37 biases the bracket 36 to the full line position of Figure 4 yet by pressure exerted in a leftward direction with reference to Figure 4 on split ears 39 and 40 the bracket 36 may move to the dotted line position of Figure 4. Because of the fixed positioning of the tubular support 42 in split ears 39 and 40 when the bracket 36 assumes the dotted line position of Figure 4, my indicator will be in position wherein it has moved outwardly adjacent from wall 10 of wheel 11. This allows a limited movement should it encounter a rock or other solid extraneous object.

Thus, because my tubular support 42 is fixedly positioned in split ears 39 and 40, rotary motion imparted thereto by the engagement of a rock or other stationary object encountering angled end 44 will cause movement of the bracket 38 from the full to the dotted line position of Figure 4 as the angled portion 44 is moved away from the wall 10 of wheel 11.

Tubular support 42 is snugly retained in position in ears 39 and 40 by the tightening down of the cap screws therein as shown in Figure 5. Support 42 is hollow, is provided with a closure cap 43, an angle portion 44 and a thread 45 at the lower end thereof.

Supported on threaded portion 45 is a removable cartridge switch generally designated 48. Switch 48 is provided with an indicator finger 49 flanged at 50 to provide a retaining ring which is seated in a rubber bushing 51 provided with a ferrule 52 positioned in the end of gland nut 46. Indicator 49 has a reduced portion 53 surrounded by a rubber spacer 54 having a vertically convex surface. Finger 49 is also provided at its upper end with a contact ring 55 (usually of silver) fixedly secured thereto and connected to an electrical lead wire 56 by a soldering lug 58. A second contact ring 59 (likewise usually of silver) having a diameter such as to provide only a slight clearance with respect to contact ring 55 is fixedly positioned at the end of an inner sleeve 60, the interior surface of which is abutted by rubber spacer 54. Sleeve 60 is also threaded at 61 into gland nut 46 and end 61 serves to fixedly position a steel washer 62 in gland nut 46 in which is retained ferrule 52A of bushing 51.

Thus, it will be seen that gland nut 46 provides a moisture proof and dust tight connection for switch 48 to tubular support 42. By the removal of gland nut 46 the entire switch 48 may be removed as a unit. The extremely slight clearance provided for the silver contact rings 55 and 59 insures that slight movement of the exterior end of finger 49 will cause engagement and consequently closure of the alarm circuit. However, the provision of resilient spacer 54 provides a relatively fixed position of finger 49 and although only slight movement is necessary, relatively greater pressure is needed to accomplish this slight movement.

By reference to Figure 1, it will be seen that the tubular support 42 is grounded at 65 and lead 56 is connected to an operator actuable switch 66 leading to a light 68 or other indicator which is connected to a battery 69 one pole of which is connected to the ground at 70. Thus, when switch 66 is closed, the engagement of the silver contact rings 55 and 59 will complete a circuit causing the light 68 or other indicator to actuate.

It will be further seen from reference to Figure 1 that angle 44 is declined vertically and rearwardly of the direction of travel of the vehicle, the direction of travel being indicated by the arrow 71, and direction of rotation of the wheel 10 being indicated by the arrow 72. By reference to Figure 2, it will be seen that the support 42 is inclined slightly toward wall 10 and positioned closely adjacent thereto. It will thus be appreciated that any deviation or deformity in the wall 10 of constant duration will provide a constant actuation by signal 68 and any deviation of cyclical duration will provide a cyclical actuation of signal 68. The provision of compression spring 37 and the fixed mounting of tubular support 42 in ears 39 and 40 provides that if a rock or other extraneous object should engage the finger 49 or gland nut 46 the angle 44 will be bent backwardly and outwardly with reference to Figure 2 or from the full to the dotted line position of Figure 4, thus allowing the rock or other object to pass thereby.

As many widely differing embodiments of this invention may be provided without departing from the spirit and scope thereof, it is to be understood that I do not specifically limit myself to the embodiments disclosed herein.

What I claim is:

1. In combination, an elongated member having means adjacent one end for supporting the same from the framework of a motor vehicle, at least a portion of said member adjacent the other end thereof being hollow, means threaded on said hollow end of said elongated member for concentrically supporting an insulating element, said element in turn concentrically supporting an elongated indicator actuator member having an extension partially within and partially without said hollow member, a tubular sleeve threaded into said means threaded on said hollow end of said elongated member, resilient insulating means supporting said extension of said indicator actuator member within said sleeve in spaced relation with reference to said sleeve, a contact element located on said end of said indicator actuator member within said sleeve and a second contact element positioned on said tubular sleeve and slightly spaced from said first contact element.

2. In combination, an elongated member having means adjacent one end for supporting the same from the framework of a motor vehicle, at least a portion of said member adjacent the other end thereof being hollow, a gland nut threaded on said end of said elongated member, said gland nut supporting a resilient means in turn supporting an elongated indicator member substantially adjacent the center thereof, a tubular sleeve threaded into said gland nut and resilient means positioning one end of said indicator member in spaced relation with reference to said tubular sleeve, a contact element located on the interior end of said indicator member and a second contact element positioned on said interior sleeve and slightly spaced therefrom.

3. In combination, an elongated hollow member having means adjacent one end for supporting the same from the framework of a motor vehicle, a gland nut threaded on said end of said elongated member, said gland nut supporting a rubber sleeved element in turn supporting an elongated indicator member interior of the ends thereof, a tubular sleeve threaded into said gland nut and resilient means positioning one end of said indicator member in spaced relation with reference to said tubular sleeve, a contact element located on said spaced end of said indicator member and a second contact element positioned on said interior sleeve and slightly spaced from said first contact element.

4. In combination, a first, elongated hollow member having means adjacent one end for supporting the same from the framework of a motor vehicle, said first member being hollow throughout the extension thereof, cap means substantially enclosing the end adjacent said motor vehicle framework, a removable switch at the other end thereof comprising a gland nut threaded on said other end of said first member, a resilient insulating element concentrically supported in said gland nut and providing a tubular sleeve for a second elongated indicator actuator member, said elongated indicator actuator member having a portion extending exterior of said gland nut and a portion extending interior of said gland nut and an integral retaining ring engaged by said concentric resilient element, a tubular sleeve threaded into said gland nut and resilient insulating means positioning said interior end of said second member with reference to said tubular sleeve in concentric spaced relation, a contact element located on the interior end of said indicator member and a second contact element positioned on said tubular sleeve and slightly spaced therefrom.

5. In combination, a rigid elongated member having means adjacent one end for supporting the same from the framework of a motor vehicle, said elongated member being hollow throughout at least a portion thereof adjacent the other end, an elongated element, means securing said elongated element to said other end of said hollow elongated member so that one end extends thereinto and one end extends therefrom and comprising a first annular resilient means positioning said elongated element within said hollow member and serving to close one end thereof, a second annular resilient means spaced with reference thereto positioned to space the interior end of said elongated element from said hollow member, and said first resilient means serving to axially immobilize but permit tilting movement of said elongated element.

6. In combination with an elongated member having a movable sensing means at one end thereof, the improvement comprising a supporting bracket, a pair of horizontally spaced and adjustably positioned retaining lugs secured to one side of said supporting bracket, said lugs having parallel central recesses whereby said lugs may be positioned upon adjacent spring bolt members of a motor vehicle, the other side of said supporting bracket having a pair of vertically spaced apertured bosses, a pin supported in said bosses, a retaining bracket having a central lug and a pair of split ears positioned one on either side thereof and at right angles thereto, said retaining bracket being pivoted on said pin, means for retaining said elongated member in said split ears, coil spring means positioned between said supporting bracket and said central lug for biasing said lug in a direction away from said supporting bracket and means for limiting the biased position of said lug.

7. The structure of claim 6 further characterized in that said elongated element is gripped in said split ears and substantially parallel to said pin and the sensing end of said elongated member declines in a direction opposite the direction in which the vehicle normally moves.

8. In combination with an elongated member having a movable sensing means at one end thereof, the improvement comprising a supporting bracket, adjustable means secured to one side of said bracket for positioning said bracket upon the spring bolt members of a motor vehicle, means secured to the other side of said bracket including a pivot pin, a retaining bracket pivoted on said pin and including means for supporting said elongated member, spring means engaging said retaining bracket and said supporting bracket for normally biasing said retaining bracket in a given direction about said pivot and means for limiting the biased position of said bracket.

9. The structure of claim 5 further characterized by said elongated element having a first electrical contact means thereon and said elongated member having a second electrical contact means thereon whereby tilting movement of said elongated element will cause closure of said first and second contact means.

References Cited in the file of this patent

UNITED STATES PATENTS

| | | |
|---|---|---|
| 1,754,929 | Atticks | Apr. 15, 1930 |
| 1,775,629 | Bone | Sept. 16, 1930 |
| 1,941,753 | Plies | Jan. 2, 1934 |
| 2,084,939 | Byron | June 22, 1937 |
| 2,258,334 | Miller | Oct. 7, 1941 |
| 2,479,371 | Kite | Aug. 16, 1949 |
| 2,538,493 | Askins | Jan. 16, 1951 |
| 2,593,824 | Wilson | Apr. 22, 1952 |
| 2,600,095 | Consolo | June 10, 1952 |
| 2,619,307 | Cramer | Nov. 25, 1952 |

FOREIGN PATENTS

| | | |
|---|---|---|
| 603,972 | France | Jan. 17, 1926 |